United States Patent [19]

Beutler et al.

[11] Patent Number: 4,739,691
[45] Date of Patent: Apr. 26, 1988

[54] METHOD OF AND APPARATUS FOR LOADING/UNLOADING A LARGE MISSILE INTO/FROM A HORIZONTALLY POSITIONED CANISTER

[75] Inventors: Henry W. Beutler; Roland T. Ingels; Jack R. Kilgore, all of Brigham City, Utah

[73] Assignee: Morton Thiokol, Inc., Chicago, Ill.

[21] Appl. No.: 16,689

[22] Filed: Feb. 19, 1987

[51] Int. Cl.⁴ .............................................. B60V 1/00
[52] U.S. Cl. .................. 89/1.801; 89/1.805; 414/676
[58] Field of Search ............... 89/1.801, 1.802, 1.804, 89/1.805, 1.809, 1.810, 1.816; 414/676

[56] References Cited

U.S. PATENT DOCUMENTS

| | | | |
|---|---|---|---|
| 3,072,022 | 1/1963 | Wood et al. | 89/1.810 X |
| 3,094,223 | 6/1963 | Smith | 414/676 |
| 3,513,934 | 5/1970 | Crowley | 414/676 X |
| 3,826,329 | 7/1974 | Crimmins et al. | 414/676 X |
| 3,857,321 | 12/1974 | Cohen | 89/1.810 |
| 3,923,165 | 12/1975 | Burdick | 414/676 |
| 4,172,506 | 10/1979 | Terry | 414/676 X |
| 4,602,552 | 7/1986 | Steinmetz | 89/1.816 |
| 4,604,940 | 8/1986 | Mendelsohn et al. | 89/1.816 |
| 4,646,617 | 3/1987 | Robinson | 89/1.816 X |

Primary Examiner—David H. Brown
Attorney, Agent, or Firm—Gerald K. White

[57] ABSTRACT

Air bearing pads enable the installation of a large missile stage in a canister or removal therefrom while the canister is in a horizontal position. Each air bearing pad includes interior passages which channel air through perforated strutted elements to allow air under pressure applied to the pad to reach exit air holes in either the bottom or top thereof. The pressurized air stream into the pad produces a force in the direction of the exit air holes. The sum of this force from several pads in series and several columns of pads positioned between the missile stage and the canister inside wall at the bottom 120 degree area thereof lifts the missile stage sufficiently to allow movement thereof into or out of the canister by means of a powered winch. The number of air bearing pads required for a large number of canisters may be minimized by removal of the air bearing pads after installation of the missile stage in the canister and replacement thereof with prior art semi-solid lateral support pads.

5 Claims, 3 Drawing Sheets

METHOD OF AND APPARATUS FOR LOADING/UNLOADING A LARGE MISSILE INTO/FROM A HORIZONTALLY POSITIONED CANISTER

BACKGROUND OF THE INVENTION

1. Field of the Invention

The present invention relates to an improved method of and apparatus for loading a large missile into a canister and for unloading it therefrom.

2. Description of the Prior Art

A large missile such as the Small Intercontinental Ballistic Missile (SICBM) includes a booster assembly with a guidance system and a warhead placed on top. The booster assembly generally comprises first, second and third solid propellant missile stages. Practical considerations dictate having the missile operational or launching site at a location remote from the place of manufacture and assembly of the booster assembly. This presents a problem particularly in respect of limiting to 2G's the lateral loads to which the booster assembly may be safely subjected during transportation thereof to the operational site.

In order to attenuate such lateral loads, the booster assembly requires lateral support pads between the booster assembly and the inside walls of the canister. Such pads have been made from semi-solid material, specifically, rubber with an internal honeycomb structure and are only slightly compressible. As a consequence, the method employed in the prior art to install the booster assembly of a large missile in a canister or to remove the booster assembly therefrom is with the canister in a vertical position.

Vertical loading and unloading of a missile booster assembly into or from, respectively, a canister is disadvantageous in that such loading requires additional facilities such as buildings, cranes and loading pits. Such facilities are costly. Thus, where such facilities are not already available there is a need and a demand for a viable alternative to vertical loading and unloading of missile booster assemblies into and from canisters in order that a considerable cost saving may be realized.

SUMMARY OF THE INVENTION

An object of the invention is to provide an improved method of and apparatus for loading/unloading the booster assembly of a large missile into/from a canister.

Another object of the invention is to provide such an improved method of and apparatus where there is a requirement for the booster assembly to be supported by lateral support pads between the booster assembly and the inside wall of the canister and which eliminates the need for the canister to be in a vertical position.

A further object of the invention is to provide such an improved method of and apparatus wherein modified lateral support pads are used to facilitate the insertion of the booster assembly into the canister and to remove the booster assembly from the canister while the canister is in a horizontal position.

Still another object of the invention is to provide an improved lateral support pad that is selectively pressurized to facilitate horizontal loading of the booster assembly of a large missile into a canister.

A further object of the invention is to provide an air bearing/lateral support pad for facilitating the loading and unloading, respectively, of large missiles into and from a horizontally positioned canister.

In accomplishing these and other objectives of the invention, some of the prior art semi-solid lateral support pads provided between the booster assembly of the missile and the inside wall of the canister are modified into air bearing/lateral support pads (hereinafter, for convenience referred to as "air bearing pads") by adding interior passages to channel a flow of air through strutted elements therein. This channeling, in one embodiment of the invention, allows air to reach exit holes in the lower or bottom sides of the air bearing pads facing the inside wall of the canister. These holes are sized to allow the correct volume of air to flow to each air bearing pad to produce a desired missile booster assembly lifting force. Each air bearing pad also has a small skirt around the edges to contain the air and thereby to provide more lift. The air bearing pads may be attached to the cylindrical surface of the booster assembly as by means of circumferential cables or in any other suitable manner and may cover the lower or bottom 120 degree area of the booster assembly/canister during insertion of the booster assembly into the canister. The semisolid lateral support pads as used in the prior art (hereinafter for convenience referred to as "standard lateral support pads") are used for the remaining 240 degree area of the booster assembly/canister.

The air bearing pads are connected to each other in series with air lines or hoses and hose couplers. At each missile stage interface, quick disconnect fittings connect the air bearing pads between each missile stage interface connection. The air bearing pads are connected to air hoses by way of air manifolds that are positioned at the forward end of the booster assembly and are pressurized prior to installing the booster assembly into the canister. The air bearing and standard lateral support pads are installed on the booster assembly prior to inserting the booster assembly into the canister. The distance of each air bearing pad from its associated manifold determines whether one or two air hoses is required to provide an adequate air flow.

The pressurized air stream into each air bearing pad produces a force in the direction of the exit air holes. The sum of this force from several air bearing pads in series (and several columns of these air bearing pads) lifts the missile booster assembly sufficiently from the canister inside wall to enable the booster assembly to be moved into or out of the canister without requiring the use of cranes or vertical structures. Movement of the booster assembly into and out of the canister is accomplished by means of a powered winch.

If there is a requirement for the air bearing pads to be attached to the canister rather than to the missile booster assembly, the air exit holes in the air bearing pads may be located on the upper or top side thereof and face the surface of the booster assembly. All other provisions for horizontal loading and unloading should remain as described.

In accordance with the invention, an option exists to minimize the number of air bearing pads that are required for a large number of canisters. Effectuation of this option requires removal of the air bearing pads after the missile booster assembly has been installed and replacement of them with the standard lateral support pads.

Specifically, once the booster assembly is installed in the canister, the canister is rotated about its longitudinal axis approximately 180 degrees or until a row of air bearing pads is on the top. The aft end of the longitudinal row of air bearing pads nearest the top is connected to the winch cable. The forward end of the same row of air bearing pads is attached to a row of standard lateral support pads which are secured together by a cable. With the use of the powered winch, the row of air bearing pads is pulled out one end of the canister and at the same time, the row of standard lateral support pads is pulled into the other end of the canister. The canister is then further rotated until another row of air bearing pads is on top. The above process is repeated to replace the air bearing pads with standard lateral support pads. The process is continued until all of the air bearing pads have been replaced with standard lateral support pads.

Prior to removing the missile booster assembly from the canister, the process is reversed and the lateral support pads are replaced with air bearing pads. Once this replacement has been effected, the canister is rotated about its longitudinal axis approximately 180 degrees or until the rows of air bearing pads cover the lower 120 degree area of the canister.

It is noted that the implementation of this option requires modification of the lateral support pad system, as follows:

1. The air bearing and standard lateral support pads must be arranged to attach to each other longitudinally (the pads cannot be secured in place with circumferential cables).
2. The forward and aft ends of each row of longitudinal pads shall be secured to the missile booster assembly or the canister depending upon whether the pads are intended to fly-out or remain in the canister.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying figures of drawing which form part of the specification, in which like parts are designated by the same reference numbers, and of which.

DESCRIPTION OF THE PREFERRED EMBODIMENTS

Figure 1:
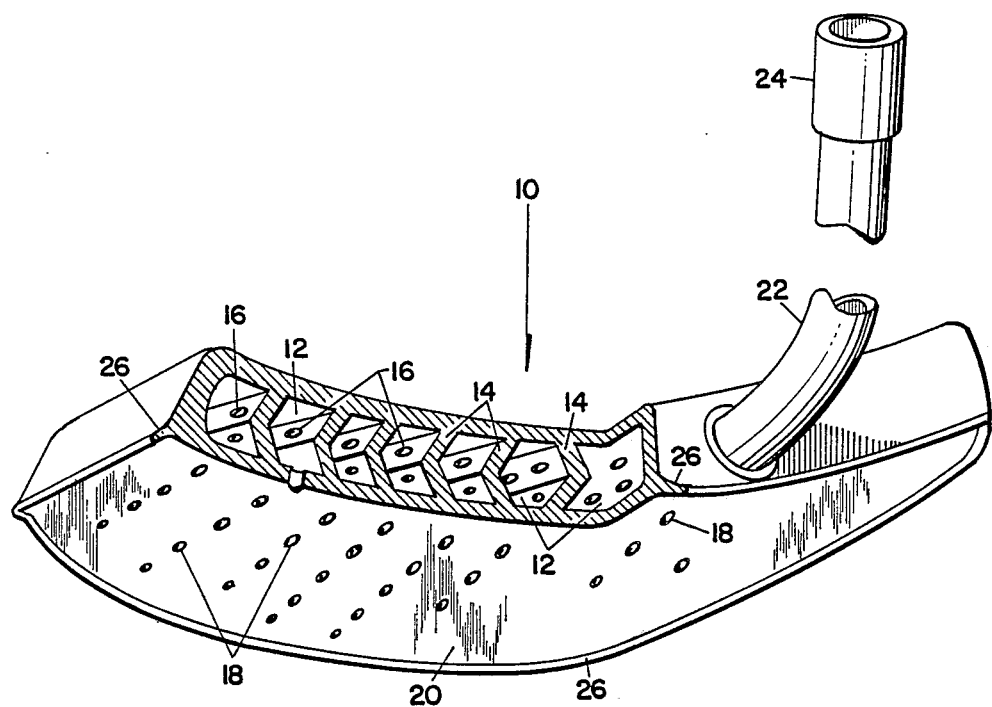
FIG. 1 is a perspective fragmented view with parts shown in cross section of an air bearing pad according to the invention with an attached air line and quick disconnect fitting.

The air bearing pad 10 shown in FIG. 1 may be similar in size to the standard lateral support pads employed in the prior art which, typically, are cushion-like in structure, generally square, cover an area of about a square foot, and are about an inch and a half thick. Also, similarly to the standard lateral support pad, the air bearing pad 10 may be made of rubber and includes opposing walls forming a top and a bottom that are configured to the curvature of the outside surface of the missile and the inside wall of the canister. The air bearing pad 10 differs significantly from the standard lateral suppport pad in the substitution for the honeycomb internal structure of the latter of a structure including a number of internal passages indicated generally by the reference numeral 12 to channel air under pressure through perforated angular strutted elements 14 having holes 16 therein. This channeling allows air to reach exit holes 18 in the lower side or bottom 20 of the air bearing pad 10. Air under pressure is supplied to the passages 12 from an air line or hose 22. One end of air line 22 is suitably connected to air bearing pad 10 in communicating relation with passages 12. A quick disconnect fitting 24 is connected to the other end of the air line 22. The air bearing pad 10 also has a small skirt 26 around the edges thereof to contain the air and thus provide more lift.

Figure 2:
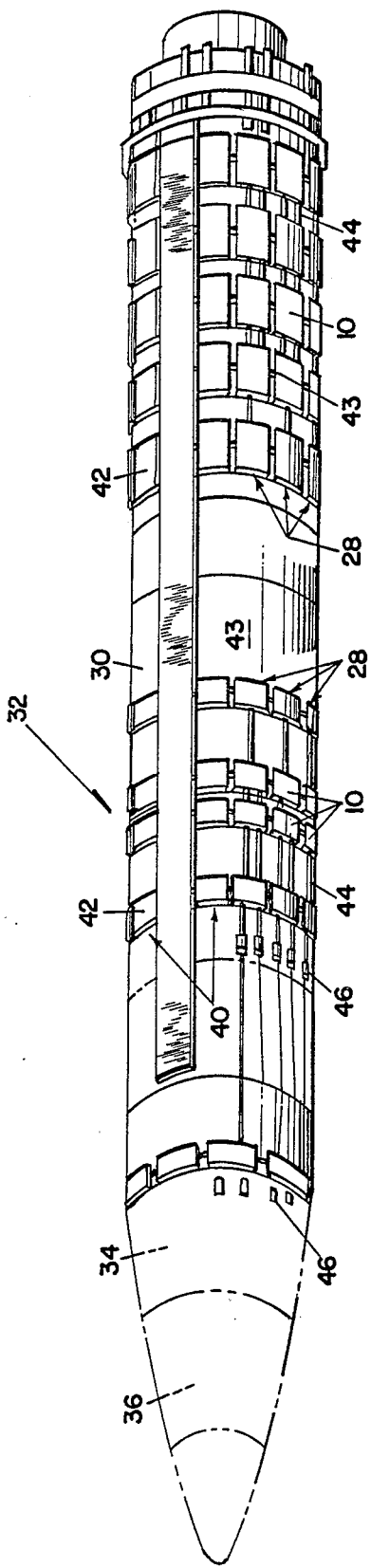
FIG. 2 is a perspective view of a large missile including a booster assembly having attached to the outer surface thereof a number of rows of standard lateral support pads and several rows of air bearing pads.
Figure 3:
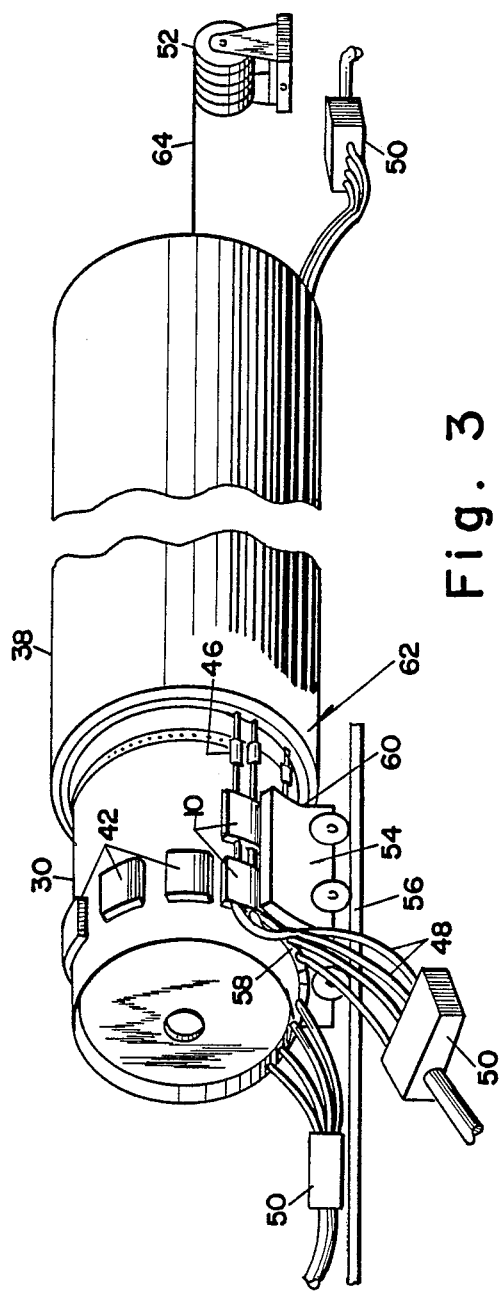
FIG. 3 is a fragmented perspective view illustrating movement by means of a powered winch of a missile booster assembly into a horizontally positioned canister.

As shown in FIG. 2, several columns or rows indicated at 28 of air bearing pads 10 are attached to the outer surface of the booster assembly 30 of a missile indicated generally by reference numeral 32 and also including a guidance system 34 and a warhead 36. The air bearing pads 10 cover the bottom 120 degree area of the canister/missile booster assembly during insertion of the booster assembly 30 into a canister 38, as shown in FIG. 3. A number of columns or rows 40 of standard lateral support pads 42 are provided on the remaining outer surface of the booster assembly 30. In FIG. 2 both the air bearing pads 10 and the standard lateral support pads 42 are shown secured to the surface of the booster assembly 30 by circumferential cables 43.

The air bearing pads 10 in each row 28 are connected or hooked up to each other in series with air hoses 44 and air hose couplers or quick disconnect fittings 46. At each missile stage interface, the quick disconnect fittings 46 hook up the air bearing pads 10 between each missile stage interface connection. The air bearing pads 10 are hooked up to air hoses 44 by way of air manifolds 50 positioned at the forward end of the booster assembly 30 and pressurized prior to installing the missile into the canister 38. The air bearing pads 10 and the standard lateral support pads 42 are installed on the booster assembly 30 prior to installing the latter in the canister 38. The distance from a particular air bearing pad 10 from the manifold will determine whether one or two air hoses 48 will be required to provide an adequate air flow.

The pressurized air streams into each of the air bearing pads 10 produces a force in the direction of the exit air holes 18 in the bottom thereof. The sum of this force from several air bearing pads 10 in series, and in several rows of these air bearing pads 10, lifts the booster assembly 30 sufficiently from the inside wall of the canister 38 to move the booster assembly 30 into or out of the canister with the aid of a powered winch 52, as illustrated in FIG. 3.

Figure 4:
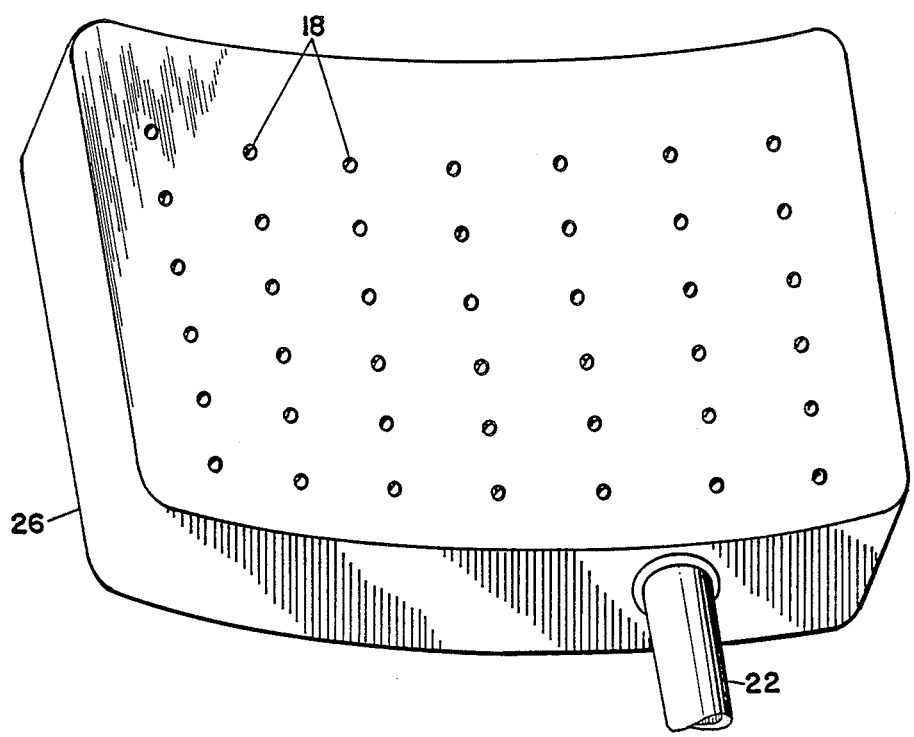
FIG. 4 is a perspective view illustrating a modified form of air bearing pad according to the invention having utility for attachment to the canister inside wall and in which the exit holes are located on the top side thereof and face the missile booster assembly surface.

If it is required that the air bearing pads 10 be attached to the inside wall of the canister 38 rather than to the surface of the missile booster assembly 30, the air exit holes 18 may be located on the inside surface of the air bearing pads 10, as shown in FIG. 4. With this modification, the air exit holes 18 face the surface of the missile booster assembly 30. All other provisions for horizontal loading and unloading may remain, as described.

For facilitating the movement of the missile assembly 30 into and from the canister 38, there is provided, as shown in FIG. 3, a wheeled carriage 54. Carriage 54 is supported by and is movable along a track 56. In turn, carriage 54 supports the forward end of the missile booster assembly 30 as the aft end thereof is being inserted into the end of canister 38. To that end, the curvature of the supporting surface 58 of the carriage 54 upon which the booster assembly 30 rests is made to correspond to the curvature of the inside wall of the canister 38. A rubber sealing member 60 carried by the carriage 54 is provided at the interface thereof with the canister 38. For convenience of illustration, some standard lateral support pads 42 have been omitted in FIG. 3.

After the air hoses 44 are connected by the quick disconnect fittings 46 in the open space indicated by the reference numeral 62 in FIG. 3, the carriage 54 is rolled back against the canister 38 as the booster assembly 30 is pulled into the canister 38 by the operation of the powered winch 52. During this operation, the rubber sealing interface 60 between the carrriage 54 and the canister 38 forms a continuous substantially air tight support surface for the air bearing pads 10.

Upon completion of the movement of the booster assembly 30 into the canister 38, the adjacent air hoses 48 may be disconnected from the air bearing pads 10 thereon and the carriage 54 may be rolled away from the canister 38.

Figure 5:
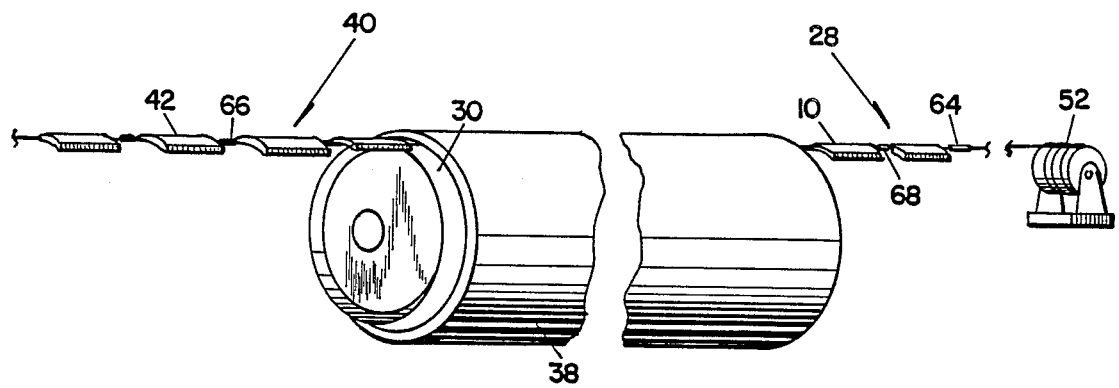
FIG. 5 is a fragmented perspective view illustrating the replacement of air bearing pads between the missile booster assembly and the canister wall with standard lateral support pads in order to minimize the number of air bearing pads required for a large number of canisters.

In FIG. 5 there is illustrated an embodiment of the invention which enables the number of air bearing pads required for a large number of canisters to be minimized. This embodiment involves removing the air bearing pads 10 after the booster assembly 30 has been installed in the canister 38 and replacing them with standard lateral support pads 42.

Specifically, once the booster assembly 30 is installed, the canister 38 is rotated approximately 180 degrees or until a row of air bearing pads 10 is on top. The aft end of the row 28 of air bearing pads 10 nearest the top of the canister 38 is connected to the cable 64 of the powered winch 52. The forward end of this same row 28 of air bearing pads 10 is attached to a row 40 of standard lateral support pads 42 which are secured together in serial fashion by a longitudinal cable 66. With the use of the powered winch 52, the row 28 of air bearing pads 10 is pulled out from between the booster assembly 30 and the canister 38, and at the same time, the row 40 of standard lateral support pads 42 is pulled into the canister 38. The canister 38 is rotated until another row 28 of air bearing pads 10 is on top. The above process is repeated to replace the air bearing pads 10 with standard lateral support pads 42. The process is continued until all of the air bearing pads 10 have been replaced. Prior to removing the missile booster assembly 30 from the canister 38, the process is reversed and the standard lateral support pads 42 are replaced with air bearing pads 10.

Figure 6:
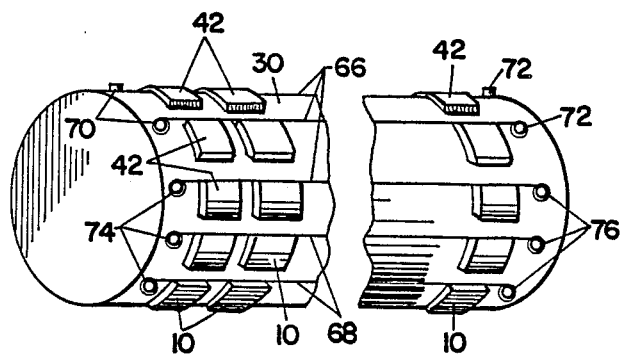
FIG. 6 is a fragmented view illustrating the connection by means of horizontal cables of the lateral supporting pads to the surface of the missile booster assembly.
Figure 7:
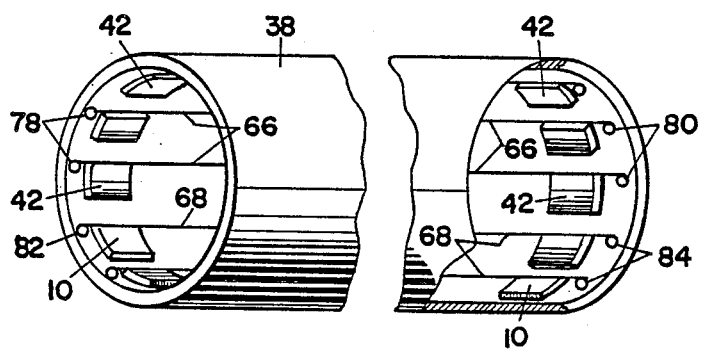
FIG. 7 is a fragmented view illustrating the connection by means of horizontal cables of the lateral supporting pads to the canister.

It is noted that effectuation of this embodiment of the invention requires some modification of the lateral support pad system, as follows:

1. The air bearing pads and the standard lateral support pads must both be arranged for longitudinal attachment. That is to say, the air bearing pads and the standard lateral support pads cannot be secured in place with circumferential cables.
2. The forward and aft ends of each row of pads are secured to the missile booster assembly or the canister depending upon whether the pads are intended to fly out with the booster assembly or to remain in the canister. To that end, each row of the standard lateral support pads 42 are connected along the length of an associated longitudinal cable 66, as previously described, and each row of the air bearing pads 10 are similarly serially connected along the length of an associated longitudinal cable 68. For securing the air bearing pads 10 and the standard lateral support pads 42 to the missile booster assembly 30, as illustrated in FIG. 6, there may be provided around the periphery of the booster assembly 30 spaced anchoring devices 70, 72 and 74, 76 to which the respective ends of the cables 66 and 68 may be attached with each of the cables 66 and 68 under suitable tension. Similarly, for securing the air bearing pads 10 and the standard lateral support pads 42 to the canister 38, as shown in FIG. 7, there may be provided around the opposed edges of the inside wall of the canister 38 spaced anchoring devices 78, 80 and 82, 84 to which the respective ends of the cables 66 and 68 are attached, again with each of the cables 66 and 68 under suitable tension.

Thus, in accordance with the invention, there has been provided an improved method of and apparatus for loading and unloading the booster assembly of a large missile such as the SICBM into and from, respectively, a canister wherein there is a requirement for the booster assembly to be supported by lateral support pads between the booster assembly and the wall of the canister. The use of the unique air bearing pad 10 according to the invention makes possible horizontal loading as a viable and cost reducing alternative to vertical loading as employed in the prior art.

With this description of the invention, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the scope of the appended claims.

What is claimed is:

1. A method of loading the booster assembly of a large missile into a horizontally positioned canister, the booster assembly having a cylindrical surface and the canister having an inside wall, comprising the steps of:

(a) positioning a plurality of air bearing pads such that when the booster assembly is installed in the canister said air bearing pads are located between the cylindrical surface of the booster assembly and the inside wall of the canister with said air bearing pads covering a substantial portion of the bottom surface area of the booster assembly;

(b) positioning a plurality of standard lateral support pads such that when the booster assembly is installed in the canister said standard lateral support pads are located between the cylindrical surface of the booster assembly and the inside wall of the canister with said standard lateral support pads covering a substantial portion of the remaining surface area of the booster assembly; and (c) pressurizing said air bearing pads prior to installing the booster assembly in the canister.

2. A method as defined by claim 1 where in said air bearing pads and said lateral support pads are serially connected in longitudinal rows that are secured longitudinally with respect to the booster assembly and the canister, and including the further steps of:

(d) once the booster assembly is installed in the canister, rotating the canister about the longitudinal axis thereof until a row of air bearing pads is on top;

(e) attaching an end of the said top row of air bearing pads to an end of a serially connected longitudinal row of standard lateral support pads;

(f) pulling out the said top row of air bearing pads from between the booster assembly and the canister and at the same time pulling the attached row of standard lateral support pads therein;

(g) rotating the canister until another row of air bearing pads is on top and repeating steps (e) and (f) to replace the then top row of air bearing pads with another serially connected longitudinal row of standard lateral support pads and continuing this procedure until all of the air bearing pads have been replaced with standard lateral support pads; whereby to minimize the number of air bearing pads required for a large number of canisters.

3. A method of loading the booster assembly of a large missile into a horizontally positioned canister, the booster assembly having a cylindrical surface and the canister having an inside wall, comprising the steps of:

(a) positioning a plurality of air bearing pads such that when the booster assembly is installed in the canister said air bearing pads are located between the cylindrical surface of the booster assembly and the inside wall of the canister with said air bearing pads covering a substantial portion of the bottom surface area of the booster assembly, wherein each of said air bearing pads includes a bottom having exit air holes therein and further includes internal perforated strutted elements and internal passages to channel air through the strutted elements to allow air to reach the exit air holes in the bottom of said air bearing pad, whereby there is produced a force in the direction of the exit air holes, the sum of which forces from the plurality of air bearing pads lifts the booster assembly sufficiently from the inside wall of the canister to allow the booster assembly to be moved into or out of the canister;

(b) positioning a plurality of standard lateral support pads such that when the booster assembly is installed in the canister said standard lateral support pads are located between the cylindrical surface of the booster assembly and the inside wall of the canister with said standard lateral support pads covering a substantial portion of the remaining surface area of the booster assembly;

(c) pressurizing said air bearing pads prior to installing the booster assembly in the canister; and (d) moving the booster assembly into the canister with the aid of a powered winch.

4. A method of loading the booster assembly of a large missile into a horizontally positioned canister, the booster assembly having a cylindrical surface and the canister having an inside wall, comprising the steps of:

(a) positioning a plurality of air bearing pads such that when the booster assembly is installed in the canister said air bearing pads are located between the cylindrical surface of the booster assembly and the inside wall of the canister with said air bearing pads covering a substantial portion of the bottom surface area of the booster assembly, wherein each of said air bearing pads includes a top having exit air holes therein and further includes internal perforated strutted elements and internal passages to channel air through the strutted elements to allow air to reach the exit air holes in the top of each air bearing pad, whereby there is produced a force in the direction of the exit air holes, the sum of which forces from the plurality, of air bearing pads lifts the booster assembly sufficiently from the inside wall of the canister to allow the booster assembly to be moved into or out of the canister, (b) positioning a plurality of standard lateral support pads such that when the booster assembly is installed in the canister said standard lateral support pads are located between the cylindrical surface of the booster assembly and the inside wall of the canister with said standard lateral support pads covering a substantial portion of the remaining surface area of the booster assembly, wherein said air bearing pads and said standard lateral support pads are each arranged in longitudinal rows and are secured to the canister;

(c) pressurizing said air bearing pads prior to installing the booster assembly in the canister; and (d) moving the booster assembly into the canister with the aid of a powered winch.

5. An air bearing pad for loading and unloading large cylindrical missiles into a horizontally positioned canister and for removing the missile therefrom comprising:

a rubber cushion-like structure having opposing walls that are configured to conform to the curvature of the outside surface of the missile and the inside wall of the canister into which the missile is to be positioned, said cushion-like structure including exit air holes in one of the opposing walls and further including internal perforated strutted elements and internal passages to channel air through the strutted elements to allow air to reach the exit air holes in said one of said opposing walls, wherein said cushion-like structure includes a skirt around the edges of said one of said opposing walls thereof to contain the air and thereby enhance the force produced in the direction of the exit air holes, whereby, upon the introduction of air under pressure into said cushion-like structure, there is produced a force in the direction of the exit air holes.

* * * * *